United States Patent
Phanco (10) Patent No.: US 7,296,594 B1
(45) Date of Patent: Nov. 20, 2007

(54) COMBINATION CHECK VALVE AND NEUTRAL VALVE ASSEMBLY FOR USE IN A HYDRAULIC COMPONENT

(75) Inventor: Eric S. Phanco, Decatur, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 249 days.

(21) Appl. No.: 11/086,052

(22) Filed: Mar. 22, 2005

(51) Int. Cl.
*F16K 15/02* (2006.01)
*G05D 7/01* (2006.01)

(52) U.S. Cl. .............................. 137/599.18; 137/512.2; 137/513.7; 137/517; 137/543.19

(58) Field of Classification Search ........... 137/599.18, 137/512.2, 513.7, 517, 543.19
See application file for complete search history.

(56) References Cited

U.S. PATENT DOCUMENTS

| | | | |
|---|---|---|---|
| 2,960,996 A * | 11/1960 | Haselton | 137/115.16 |
| 2,975,597 A | 3/1961 | Arz | |
| 3,153,423 A | 10/1964 | Biello et al. | |
| 3,175,363 A | 3/1965 | Molly | |
| 3,213,616 A | 10/1965 | Reinke | |
| 3,279,172 A | 10/1966 | Kudo et al. | |
| 3,360,933 A | 1/1968 | Swanson | |
| 3,457,949 A * | 7/1969 | Coulter | 137/543.21 |
| 3,463,185 A * | 8/1969 | Oliver et al. | 137/516.29 |
| 3,583,157 A | 6/1971 | Adams et al. | |
| 3,748,859 A | 7/1973 | Pruvot | |
| 3,782,412 A | 1/1974 | Darash | |
| 3,856,041 A * | 12/1974 | Cryder et al. | 137/493.6 |
| 3,890,788 A | 6/1975 | Habiger | |
| 3,962,872 A | 6/1976 | Budzich | |
| 4,041,703 A | 8/1977 | Knapp | |
| 4,141,216 A | 2/1979 | Engel | |
| 4,189,921 A | 2/1980 | Knapp | |
| 4,274,257 A | 6/1981 | Koch | |

(Continued)

FOREIGN PATENT DOCUMENTS

GB 2112910 7/1983

OTHER PUBLICATIONS

Circle Seal Controls, Inc., 100 Series Check Valves, Corona, California, www.circle-seal.com.

(Continued)

Primary Examiner—Stephen M. Hepperle
(74) Attorney, Agent, or Firm—Neal, Gerber & Eisenberg LLP (57) ABSTRACT

A combination neutral valve and check valve assembly is provided for use in connection with a closed hydraulic circuit and a sump such as in a hydrostatic transmission. A cage and check poppet are mounted in a valve body having an opening between the hydraulic circuit and sump. The check poppet is movable between a first position where it closes the valve opening and a second position where it is disengaged from the opening. A check compression spring is mounted in the cage and biases the poppet to the engaged position. A valve shuttle is located in the check poppet and movable between a first position where it closes a check poppet opening and a second position where it is disengaged from the opening. A neutral valve spring is engaged to the valve shuttle and the check poppet to bias the valve shuttle to the disengaged position.

22 Claims, 8 Drawing Sheets

U.S. PATENT DOCUMENTS

| | | |
|---|---|---|
| 4,300,591 A | 11/1981 | Sutton |
| 4,328,827 A | 5/1982 | Enjolras |
| 4,332,134 A | 6/1982 | Cochran et al. |
| 4,348,864 A | 9/1982 | Ichimura |
| 4,366,671 A | 1/1983 | Chichester |
| 4,519,417 A | 5/1985 | Spencer |
| 4,606,428 A | 8/1986 | Giere |
| 4,627,237 A | 12/1986 | Hutson |
| 4,637,430 A | 1/1987 | Scheffel et al. |
| 4,648,369 A | 3/1987 | Wannenwetsch |
| 4,674,287 A | 6/1987 | Ishimori et al. |
| 4,691,802 A | 9/1987 | Ishimori |
| 4,779,417 A | 10/1988 | Kita |
| 4,856,264 A | 8/1989 | Nishimura |
| 4,901,812 A | 2/1990 | Ferguson |
| 4,926,902 A | 5/1990 | Nakamura et al. |
| 4,948,092 A | 8/1990 | Kasper et al. |
| 5,000,222 A | 3/1991 | Moenkhaus et al. |
| 5,002,088 A | 3/1991 | Engelhardt et al. |
| 5,031,403 A | 7/1991 | Okada |
| 5,058,961 A | 10/1991 | Mergenthaler et al. |
| 5,101,630 A | 4/1992 | Wagenseil |
| 5,133,186 A | 7/1992 | Weissinger |
| 5,201,692 A | 4/1993 | Johnson et al. |
| 5,333,451 A | 8/1994 | Sakikawa et al. |
| 5,356,347 A | 10/1994 | Komura et al. |
| 5,378,118 A | 1/1995 | Phillips |
| 5,412,948 A | 5/1995 | Komura et al. |
| 5,479,978 A | 1/1996 | Zenkich |
| 5,546,752 A * | 8/1996 | Horton et al. ............... 60/464 |
| 5,632,467 A | 5/1997 | Just et al. |
| 5,687,468 A | 11/1997 | Hans et al. |
| 5,778,925 A | 7/1998 | Cooke |
| 5,839,468 A * | 11/1998 | Allred ................... 137/454.4 |
| 5,950,669 A | 9/1999 | Fehlmann et al. |
| 6,045,116 A | 4/2000 | Wilke et al. |
| 6,073,444 A | 6/2000 | Horton et al. |
| 6,322,474 B1 | 11/2001 | Hauser |
| 6,406,272 B2 | 6/2002 | Ruthhardt et al. |
| 6,691,512 B1 | 2/2004 | Kopel et al. |
| 6,719,005 B1 | 4/2004 | Trimble et al. |
| 6,726,399 B2 * | 4/2004 | Heeks et al. ................. 404/15 |
| 2002/0085881 A1 * | 7/2002 | Heeks ........................ 404/15 |

OTHER PUBLICATIONS

Circle Seal Controls, Inc., 200 Series Check Valves, Corona, California, www.circle-seal.com.

The Lee Company, Lee Checks, A guide to selecting the right Lee Check for your application, www.theleeco.com.

The Lee Company, Lee Pressure Relief Valves, How to select the right Relief Valve for your application, www.theleeco.com.

Kepner Products Company, Check Valves, 1996-1998, www.kepner.com.

Kepner Products Company, Relief Valves, 1996-1998, www.kepner.com.

* cited by examiner

COMBINATION CHECK VALVE AND NEUTRAL VALVE ASSEMBLY FOR USE IN A HYDRAULIC COMPONENT

BACKGROUND OF THE INVENTION

This invention relates generally to the design of valves and, more particularly, to the design of a combination check valve and neutral valve for use in a hydraulic component such as a hydrostatic transmission or integrated hydrostatic transaxle using a closed hydraulic circuit to connect a pump and a motor.

Check valves, neutral valves and pressure relief valves are known in the art. Generally, a check valve restricts flow in one direction while a relief valve is used to regulate pressure. A neutral valve will permit the flow of a hydraulic fluid from the closed circuit when the unit is at or near neutral to permit a wider neutral band. The use of neutral valves in a hydrostatic apparatus is disclosed in U.S. Pat. No. 4,674,287. Pressure relief valves are used to reduce pressure spikes in the hydraulic circuit. A combination check valve and pressure relief valve is disclosed in commonly owned U.S. Pat. No. 6,691,512, the terms of which are incorporated herein by reference.

SUMMARY OF THE INVENTION

A combination check valve and neutral relief valve is provided for use in regulating the flow of fluid between a first fluid side and a second fluid side. The valve assembly will open when the pressure in the hydraulic circuit is sufficiently low to permit oil to be brought into the circuit from a sump or reservoir. The assembly also comprises a neutral valve feature that opens the circuit to the sump or reservoir when the unit is at or near neutral. A better understanding of these and other advantages, objects, features, properties and relationships of the invention will be obtained from the following detailed description and accompanying drawings which set forth illustrative embodiments and which are indicative of the various ways in which the principles of the invention may be employed.

DETAILED DESCRIPTION

Turning now to the figures, wherein like reference numerals refer to like elements, there is generally illustrated in FIGS. 1-7 a combination check valve and neutral valve 30. While the combination check valve and neutral valve 30 will be described in the context of a hydrostatic transaxle, it is to be understood that this description is not intended to be limiting. Rather, from the description that follows, those of ordinary skill in the art will appreciate that valve 30 may be utilized in connection with a myriad of additional applications.

With reference to FIGS. 8-11, combination check valve and neutral valve 30 is particularly suited for use in connection with a hydraulic circuit of a hydrostatic transaxle 12 having a housing 13 mounted in vehicle 10 and driving axle shafts 18 to power drive wheels 11. In this regard, the transaxle 12 generally operates on the principle of an input shaft 14 rotatably driving a hydraulic pump 16 which, through the action of its pump pistons 17, pushes hydraulic fluid to a hydraulic motor 20 through a center section 22 to cause the rotation of hydraulic motor 20. The rotation of hydraulic motor 20 causes the rotation of a motor shaft 24 which rotation is eventually transferred through a gearing system 25 or the like to drive one or a pair of axle shafts 18. A motive force may be supplied directly to input shaft 14 or indirectly by means of pulleys and belts which are connected to an internal combustion engine. For a more detailed description of the principles of operation of such a hydrostatic transaxle, the reader is referred to U.S. Pat. Nos. 5,201,692, and 6,322,474 which are incorporated herein by reference in their entirety.

Figure 10:
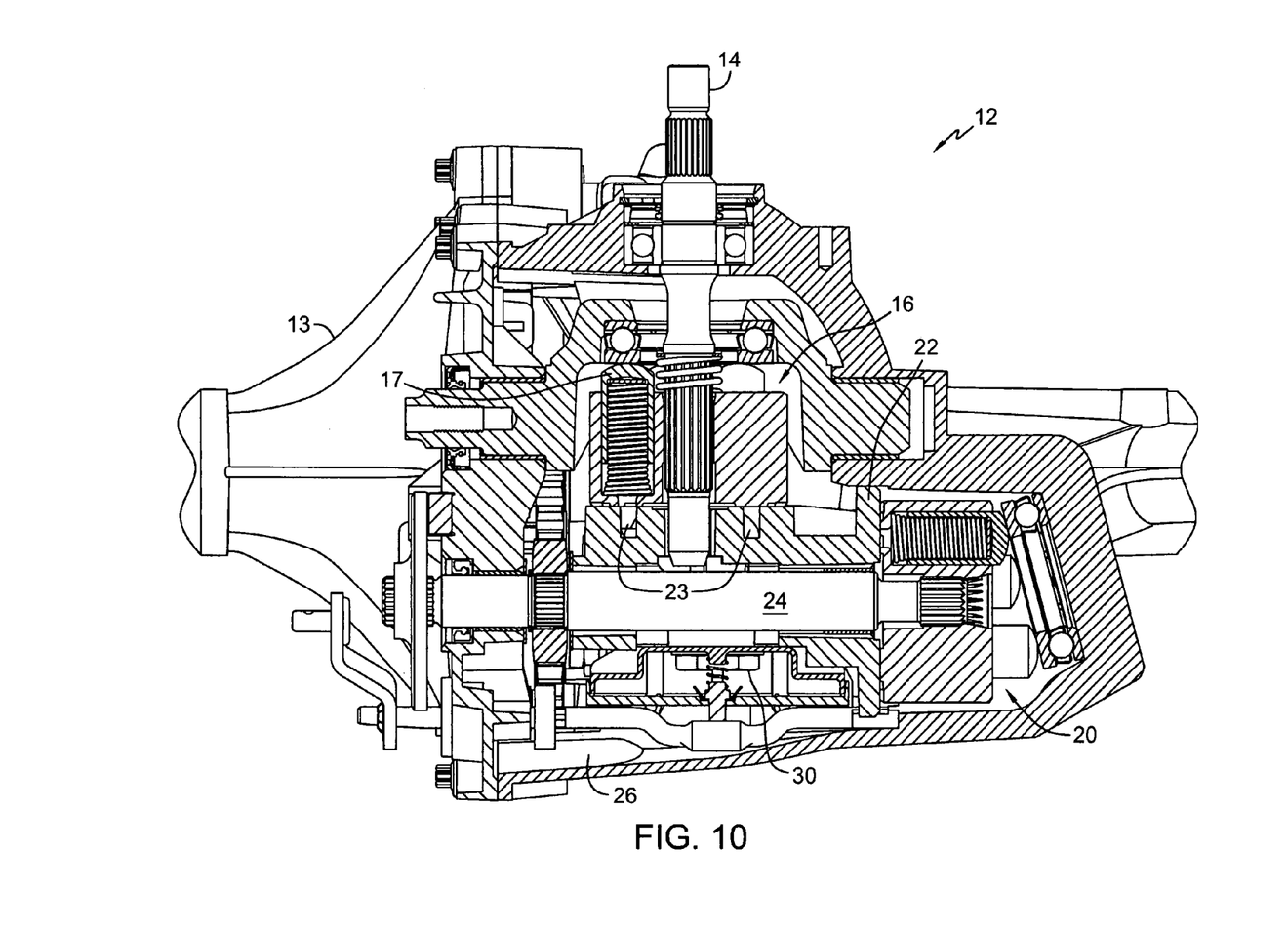
FIG. 10 is a cross-sectional, front view of the transaxle of FIG. 8.
Figure 11:
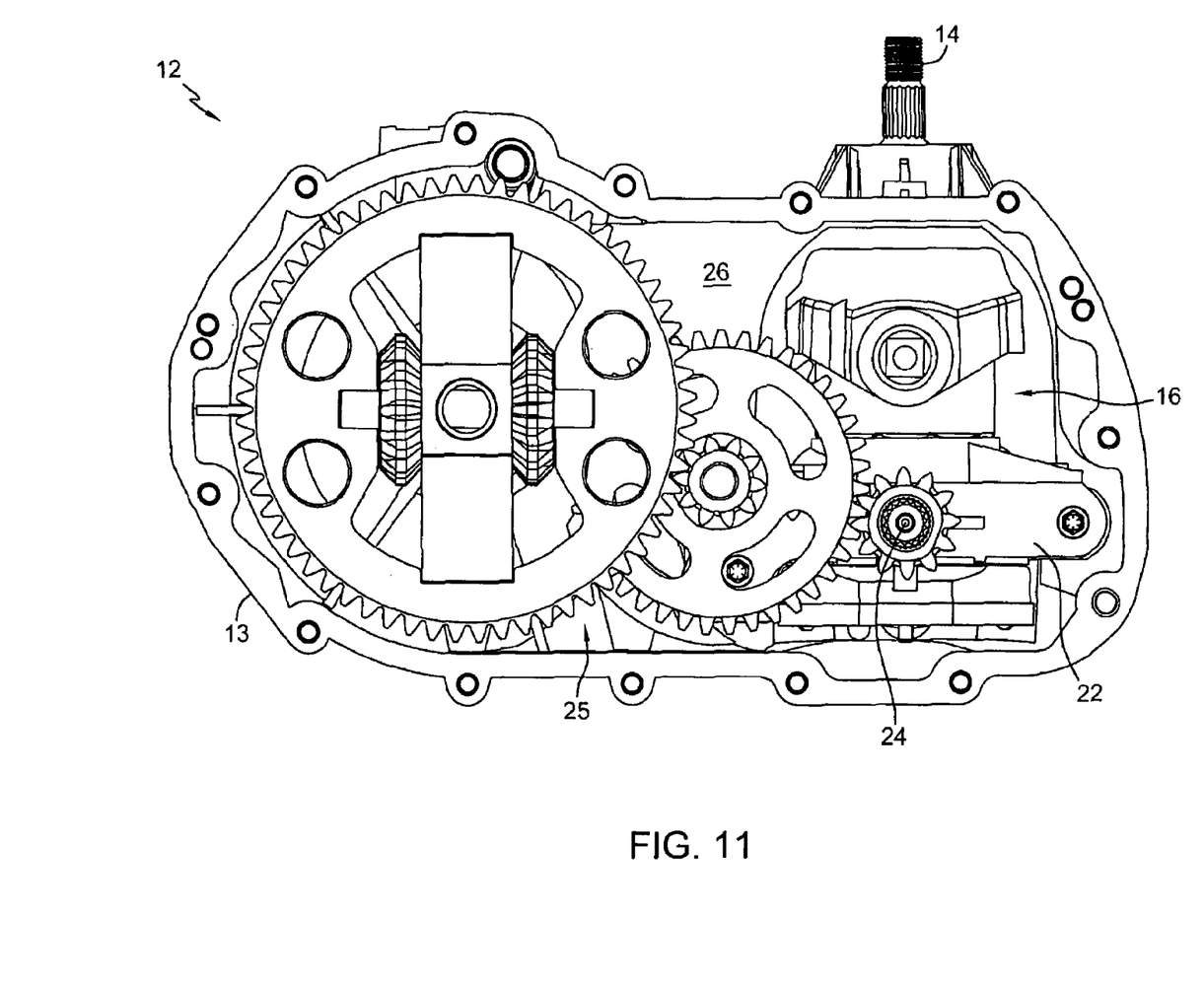
FIG. 11 is a side elevational view of the transaxle of FIG. 8 with the side housing removed to expose certain components.
Figure 12:
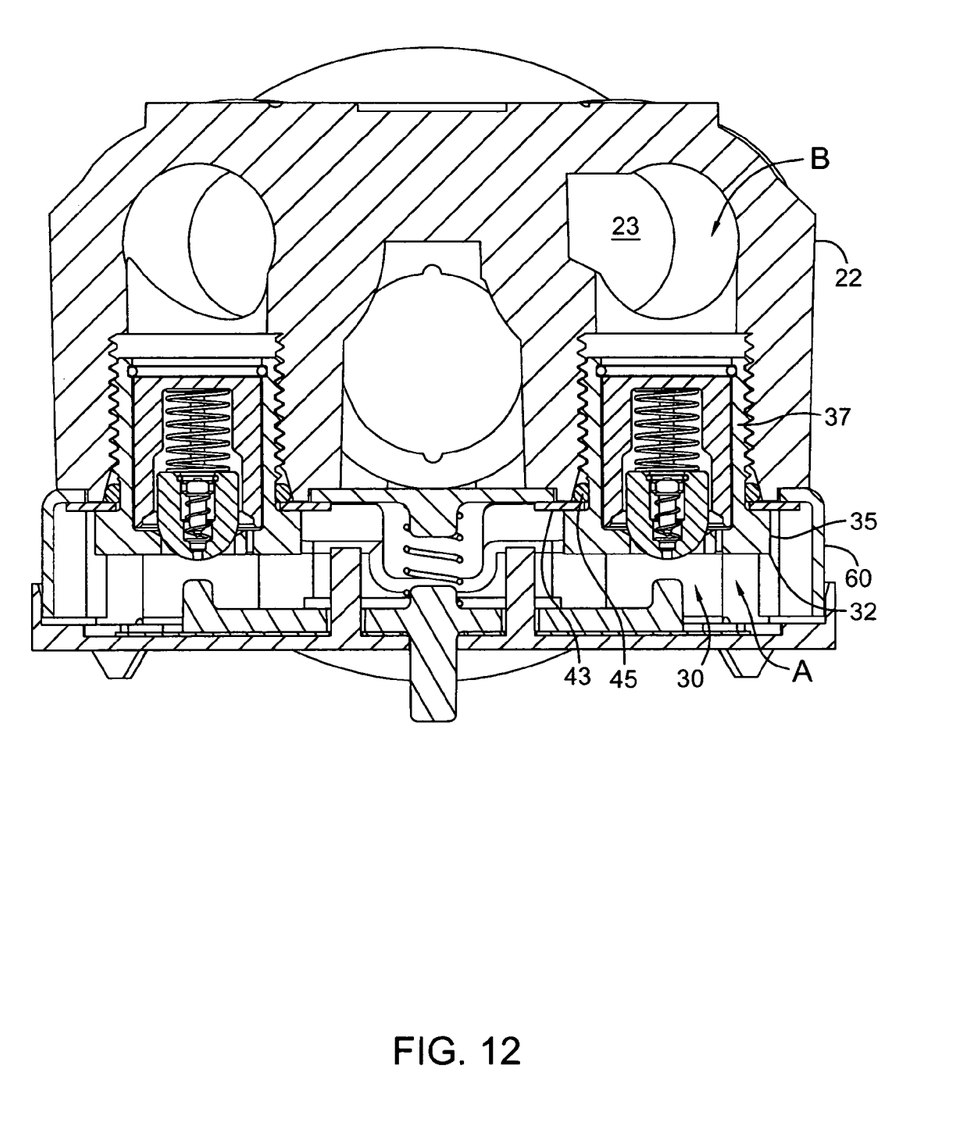
FIG. 12 is a cross-sectional view of a hydraulic mounting component such as a center section into which a valve assembly in accordance with the present invention is mounted.

Center section 22 includes hydraulic porting 23 for placing hydraulic pump 16 in fluid communication with hydraulic motor 20. The hydraulic porting is in further fluid communication with a source of makeup fluid, such as a fluid sump 26 or a charge gallery. Generally, the hydraulic porting comprises a high pressure side through which fluid moves from hydraulic pump 16 to hydraulic motor 20 and a low pressure side through which fluid returns from hydraulic motor 20 to hydraulic pump 16. Since fluid tends to leak from hydraulic porting, the hydraulic pump 16 generally requires more fluid than is returned from hydraulic motor 20 via the low pressure side porting. This requirement for fluid may, however, be satisfied by using combination check valve and neutral valve 30. Generally, combination check valve and neutral valve 30 functions to prevent the flow of fluid from the hydraulic porting to the source of makeup fluid while allowing fluid to flow from the source of makeup fluid into the hydraulic porting when the fluid pressure in the hydraulic porting is lower relative to the fluid pressure in the source of makeup fluid.

To this end, valve 30 may be mounted in center section 22 between a first fluid side A and second fluid side B, as shown in FIG. 12. In the application described herein, first fluid side A is associated with the source of makeup fluid while second fluid side B is associated with porting 23 that provides a fluid path between hydraulic pump 16 and hydraulic motor 20. As shown in FIG. 12, valve body 32 comprises a head portion 35 and a cylindrical portion 37 threaded into center section 22. In other views of valve 30 the threads are not depicted for simplicity. It will be understood, however, that this illustrated embodiment is not intended to be limiting. Rather, valve 30 may be used in connection with any closed hydraulic circuit where there is a need for makeup fluid. In this particular transaxle design, a filter housing 60 is secured to the bottom of center section 22 by washers 43 to provide filtered fluid to valves 30. O-rings 45 serve to minimize leakage about the periphery of valve 30.

Figures 1, 2, 3:
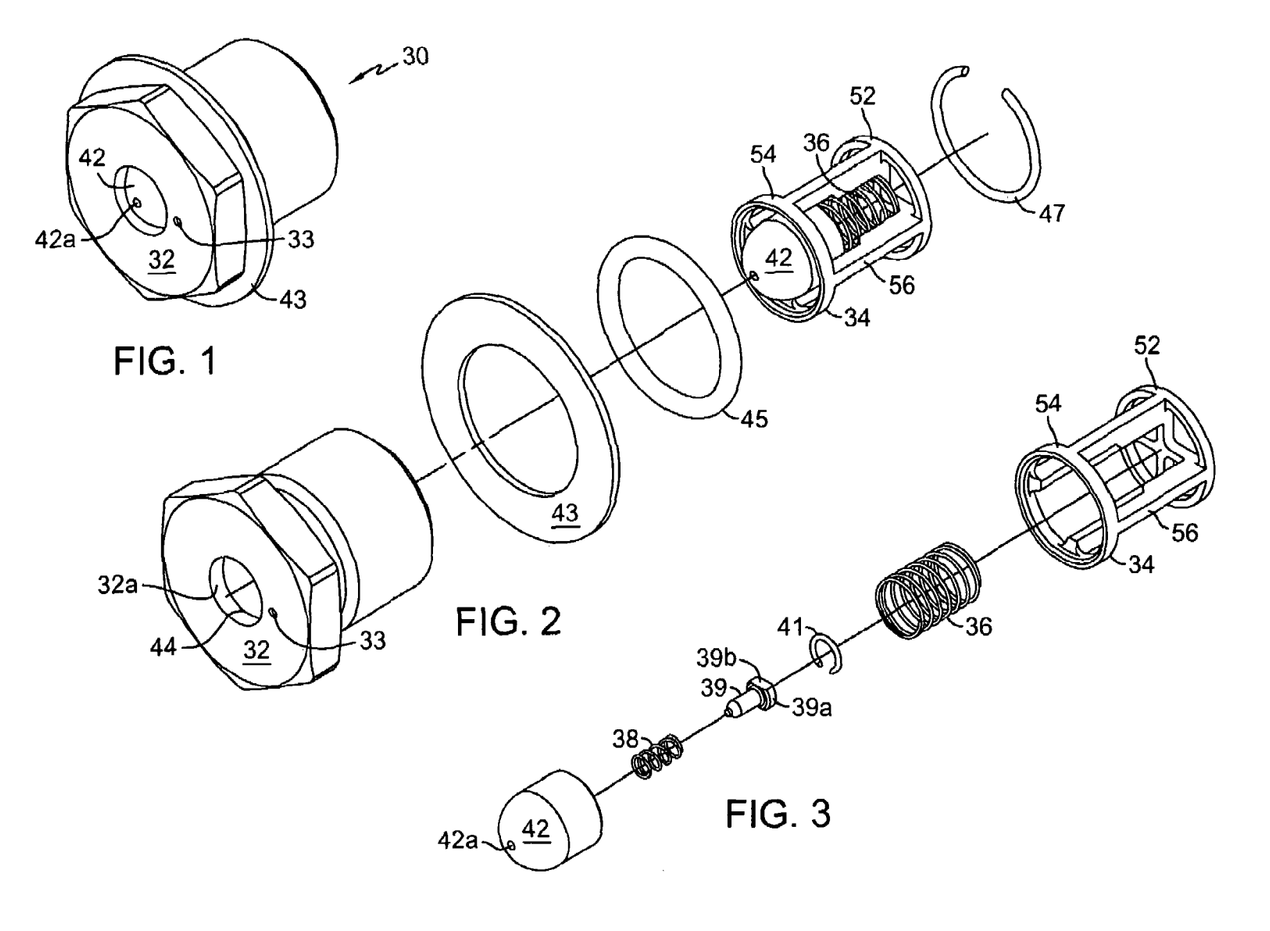
FIG. 1 is a perspective view of a combination check valve and neutral valve assembly in accordance with the present invention.
FIG. 2 is a partially exploded view of the valve assembly shown in FIG. 1.
FIG. 3 is a further exploded view of certain components of the valve assembly shown in FIGS. 1 and 2.
Figure 4:
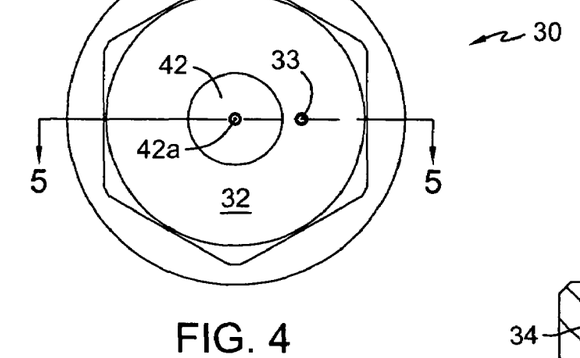
FIG. 4 is a bottom plan view of the valve assembly of FIG. 1.
Figure 5:
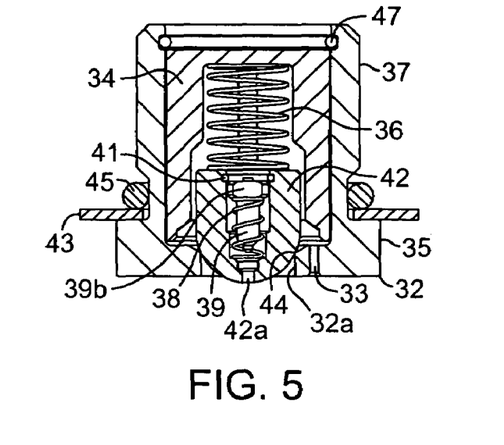
FIG. 5 is a cross-sectional view of the valve assembly of FIG. 4, along the lines 5-5, with the check valve in the closed position and the neutral valve in the open position.
Figure 6:
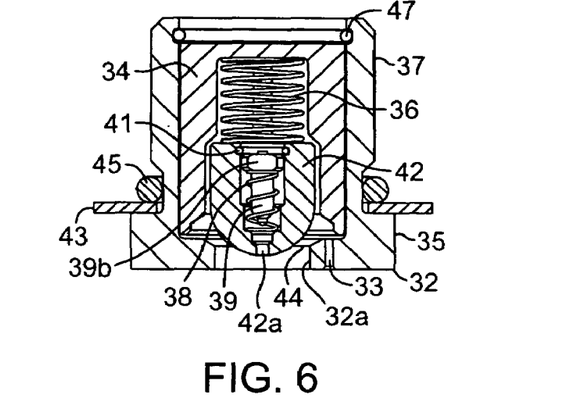
FIG. 6 is a cross-sectional view similar to FIG. 5, with both the check valve and neutral valve in the open position.
Figure 7:
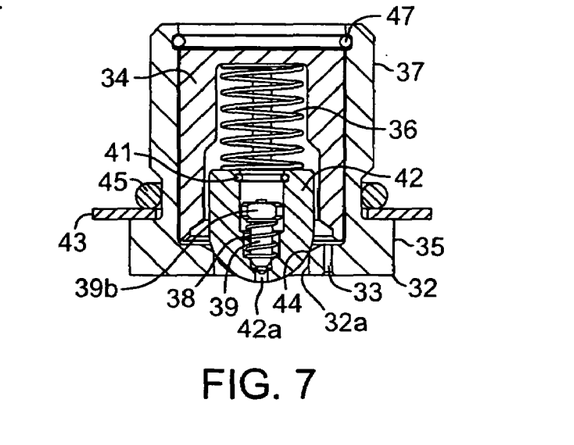
FIG. 7 is a cross-sectional view similar to FIG. 5, with both the check and neutral valves in the closed position.
Figure 8:
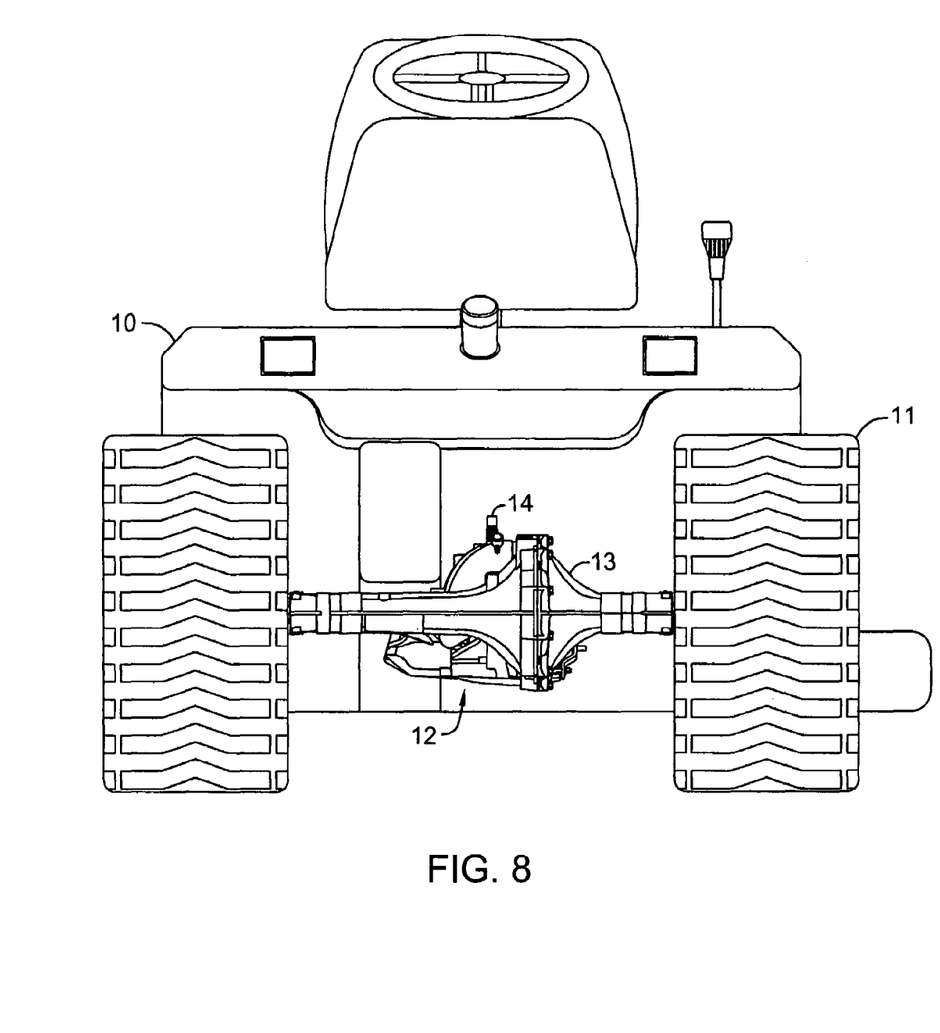
FIG. 8 is a rear view of a vehicle using an exemplary transaxle in which a valve assembly constructed in accordance with the subject invention may be mounted.
Figure 9:
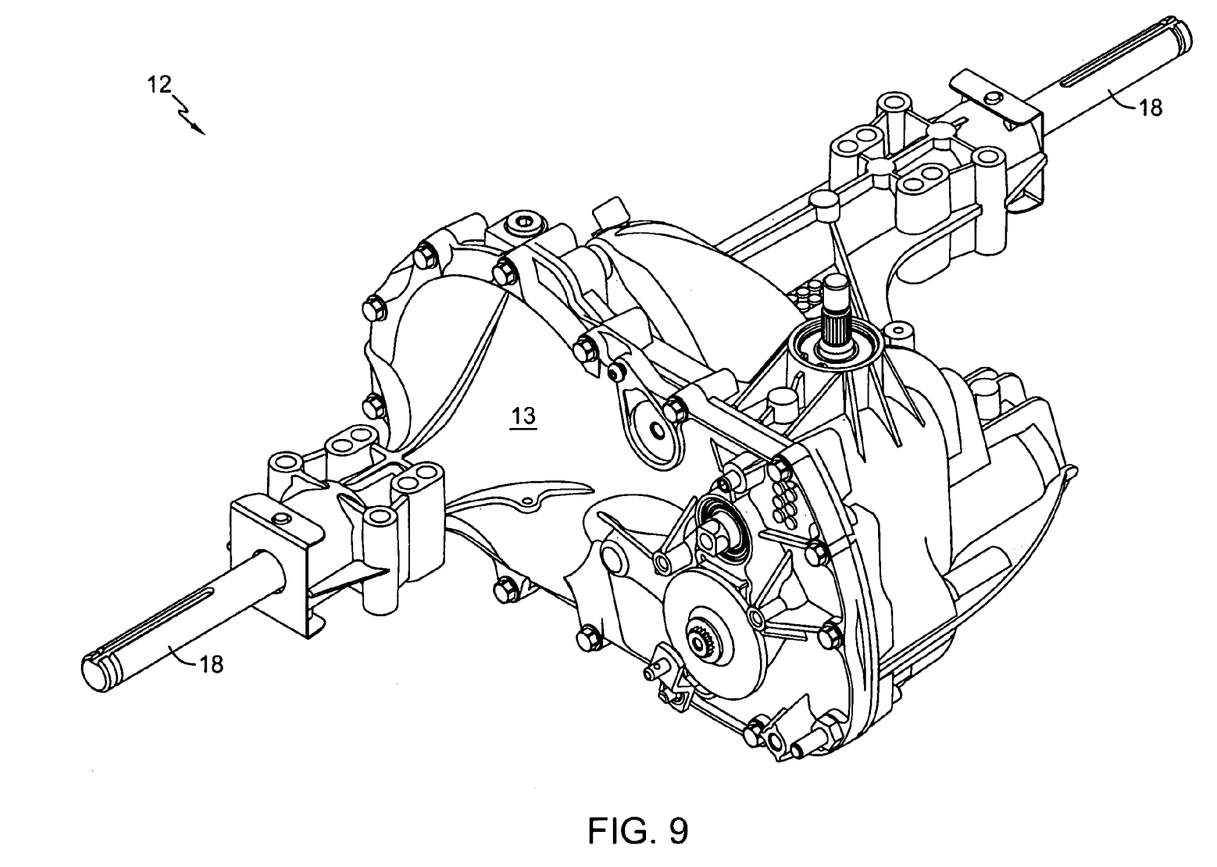
FIG. 9 is a perspective view of the transaxle shown in FIG. 8.

Valve 30 is shown most clearly in FIGS. 1-3 and 5-7. Poppet 42 is maintained in valve body 32 and in cage 34, and acts to provide the check valve function of valve assembly 30. Cage 34 comprises a first end 52 and a second end 54 connected by a plurality of ribs 56, so that fluid can flow into and out of the internal portion of cage 34 between ribs 56. Optional check compression spring 36 is mounted in cage 34 and engages the base of poppet 42 at one end and the first end 52 of cage 34 at the other end. As the pressure in fluid side B decreases below the pressure in fluid side A, check valve poppet 42 will move from the closed position, such as is shown in FIGS. 5 and 7, to the open position shown in FIG. 6, permitting fluid flow through opening 32a to fluid side B and into hydraulic porting 23. In the closed position, poppet 42 is against valve seat 44 in valve body 32 to prevent hydraulic fluid from passing through opening 32a. Note that cage 34, and thus the elements contained within cage 34, is retained within valve body 32 by retaining ring 47.

The neutral valve function is accomplished by the use of valve shuttle 39 mounted in poppet 42, with neutral valve spring 38 operatively connected to shuttle 39 between it and an inner surface of poppet 42. It will be understood by one of skill in the art that the terminology used herein is not limiting; for example, shuttle 39 may be referred to as a valve member or a poppet, while poppet 42 may be referred to as a check body or shuttle.

A retaining ring 41 acts to hold spring 38 and shuttle 39 in place inside poppet 42. Other means of retention, such as pinning, may be used instead of retaining ring 41. Spring 38 biases shuttle 39 to the open position, as shown in FIGS. 5 and 6. Thus, when pressure in the hydraulic circuit (i.e., in side B) is sufficiently low, shuttle 39 will be maintained off opening 42a (and the seat formed adjacent thereto) in poppet 42 and fluid will be able to flow out of hydraulic porting 23 through opening 42a. The head 39a of shuttle 39 is provided with a pair of flats 39b on opposite sides thereof to permit oil to flow around head 39a, through spring 38 and out of opening 42a when the neutral valve is open. As pressure in fluid side B increases, fluid flow around head 39a increases. The increase in pressure and flow eventually overcomes the spring force of neutral valve spring 38, causing shuttle 39 to move into the closed position as shown in FIG. 7.

An optional bleed 33 is formed in valve body 32 to permit hydraulic fluid to continually flow from side B to side A when the hydraulic circuit is under pressure. A bleed is used to help reduce the rate of closure of the valve to improve the operator feel of the unit and to provide smoother operation of the unit. While the unit described herein is hydrostatic transaxle 12, a person of ordinary skill will recognize that valve 30 could readily be adapted to be used in other devices, such as a stand alone hydraulic pump. In some applications, the center section or end cap in which the elements of the valve are disposed may substitute for portions of valve 30. For example, portions of the center section or end cap could replace some or all of valve body 32.

Figure 13:
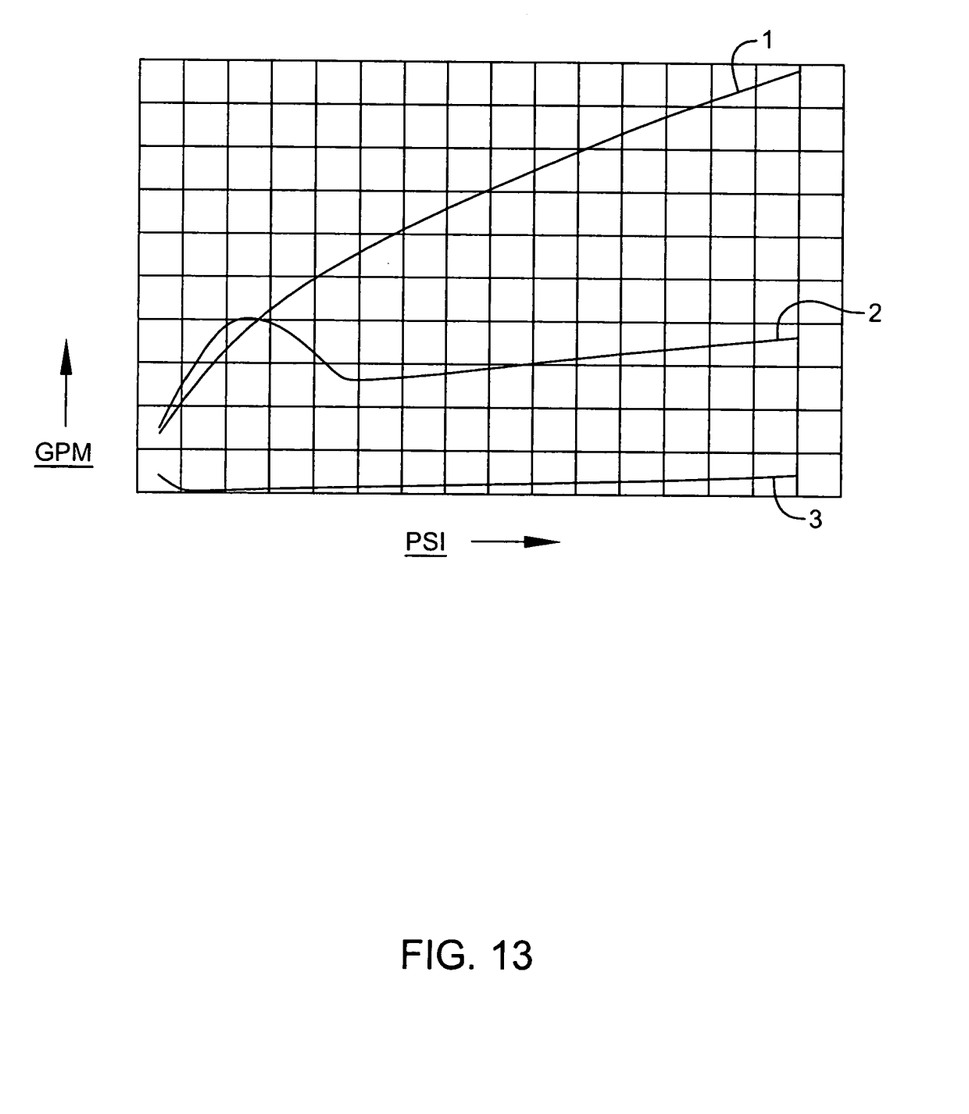
FIG. 13 is a graph depicting performance of the subject valve and other valve designs.

The invention disclosed herein provides improved performance over other known valve designs, as depicted in the graph shown in FIG. 13. In this graph, the X-axis represents the pressure inside the hydraulic circuit, while the Y-axis represents the fluid flow out of the valve.

Line 1 depicts a standard check plug with a 0.044 in. bleed formed therein, and without any neutral valve. As expected, the flow out of valve 1 continues to increase as system pressure increases, reducing efficiency and decreasing performance of the unit.

Line 3 represents the performance of a valve comprising both a neutral valve and check valve, but without a bleed orifice. The performance of this valve may be undesirable in some applications, as the valve shuts off quickly. The slight increase in the discharge rate at high pressures is due to imperfections inherent in valve construction and assembly.

Line 2 represents the performance of a combination neutral and check valve constructed in accordance with the present invention, having a 0.040 in. neutral orifice and a 0.027 in. bleed orifice. Here, bleed 33 acts to soften the closure of the neutral valve as compared to the valve represented in line 3. Also, the assembly exhibits improved efficiency and performance as compared to the unit represented by line 1.

This configuration provides several advantages. The relationship between the neutral valve portion and the check valve portion reduces the overall size of the valve. That same relationship also allows the various components to have reduced tolerances, including the ability for many of these components to be as formed, such as by metal injection molding or a casting process. Yet another advantage of this configuration is that it has a reduced sensitivity to contamination as compared to valves where the various elements interface with each other in proximity of a few thousandths of an inch or less.

While specific embodiments of the invention have been described in detail, it will be appreciated by those skilled in the art that various modifications and alternatives to those details could be developed in light of the overall teachings of the disclosure.

What is claimed is:

1. A valve assembly for use in connection with a hydrostatic transmission having a first fluid side and a second fluid side, the valve assembly comprising:
   a valve body having an opening between the first fluid side and the second fluid side;
   a cage mounted in the valve body;
   a check poppet located in the valve body and comprising a first end having a first opening formed therein, a second end having a second opening formed therein and an internal volume, where the check poppet is movable between a first position where it is engaged to and closes the valve body opening and a second position where it is disengaged from the valve body opening;
   a check compression spring mounted in the cage and engaged to the second end of the check poppet, whereby the check compression spring biases the check poppet to the first, engaged position;
   a valve member located in the internal volume of the check poppet, the valve member being movable between a first position where it is engaged to and closes the first opening of the check poppet and a second position where it is disengaged from the first opening of the check poppet; and
   a neutral valve spring engaged to the valve member to bias the valve member to the second, disengaged position.

2. The valve assembly of claim 1, further comprising a bleed orifice in the valve body.

3. The valve assembly of claim 2, wherein the bleed orifice is approximately 0.027 inches in diameter and the check poppet first opening is approximately 0.040 inches in diameter.

4. The valve assembly of claim 1, wherein the cage comprises a first end and a second end joined by a plurality of ribs, whereby fluid may flow through the cage between the ribs.

5. The valve assembly of claim 1, wherein the valve member is retained in the internal volume of the check poppet by means of a retaining ring.

6. The valve assembly of claim 1, wherein the valve body comprises a head portion and a generally cylindrical portion, and the valve body opening is located in the head portion.

7. The valve assembly of claim 1, where the valve body is configured to be mounted in a center section of the hydrostatic transmission.

8. A combination neutral valve and check valve for use in connection with a hydrostatic transmission having a closed hydraulic circuit mounted in a fluid sump, comprising:
- a valve body having an opening between the closed hydraulic circuit and the fluid sump;
- a cage mounted in the valve body;
- a check poppet located in the valve body, the check poppet comprising a first end having a first opening formed therein, a second end having a second opening formed therein and an internal volume formed between the first end and the second end, where the check poppet is movable between a first position where it is engaged to and closes the valve body opening and a second position where it is disengaged from the valve body opening;
- a check compression spring mounted in the cage and engaged to the second end of the check poppet, whereby the check compression spring biases the check poppet to the first, engaged position, and the check poppet moves to the second, disengaged position when the pressure in the hydraulic circuit is lower than the pressure in the sump by a predetermined amount;
- a valve member located in the internal volume of the check poppet, the valve member being movable between a first position where it is engaged to and closes the first opening of the check poppet and a second position where it is disengaged from the first opening of the check poppet; and
- a neutral valve spring engaged to the valve member to bias the valve member to the second, disengaged position and the valve member moves to the first, closed position when the pressure in the hydraulic circuit exceeds the force exerted by the neutral valve spring.

9. The combination neutral valve and check valve of claim 8, further comprising a bleed orifice in the valve body.

10. The combination neutral valve and check valve of claim 8, wherein the cage comprises a first end and a second end joined by a plurality of ribs, whereby fluid may flow through the cage between the ribs.

11. The combination neutral valve and check valve of claim 10, wherein the valve member is retained in the check poppet by means of a retaining ring.

12. The combination neutral valve and check valve of claim 8, wherein the valve body is configured to be mounted in a center section of the hydrostatic transmission and comprises a head portion and a generally cylindrical portion, and the valve body opening is located in the head portion.

13. A valve assembly having a check valve and a neutral valve, comprising:
- a valve body;
- a check poppet located in the valve body and comprising a first end having a first opening formed therein, a second end having a second opening formed therein, and an internal volume, wherein the check poppet is movable between a first position where the check valve is closed and a second position where the check valve is open;
- a check compression spring positioned inside a cage, the cage positioned inside the valve body, wherein the check compression spring biases the check poppet to the first position to close the check valve;
- a neutral valve member located in the internal volume of the check poppet and movable between a first position where the neutral valve member engages and closes the first opening of the check poppet and a second position where the neutral valve member is disengaged from the first opening of the check poppet; and
- a neutral spring engaged to the neutral valve member and the check poppet, wherein the neutral spring biases the neutral valve member to the second, disengaged position.

14. The valve assembly of claim 13, wherein the neutral valve member comprises a head having a periphery and at least one flat surface formed on the periphery.

15. The valve assembly of claim 13, further comprising a bleed orifice in the valve body.

16. The valve assembly of claim 15, wherein the bleed orifice is approximately 0.027 inches in diameter and the check poppet first opening is approximately 0.040 inches in diameter.

17. The valve assembly of claim 13, wherein the check poppet is biased to the first, closed position by a check spring.

18. The valve assembly of claim 17, further comprising a cage retained in the valve body, wherein the check spring and the check poppet are located between the cage and the valve body.

19. The valve assembly of claim 18, wherein the cage comprises a first end and a second end joined by a plurality of ribs, whereby fluid may flow through the cage between the ribs.

20. The valve assembly of claim 13, wherein the neutral valve member is retained in the check poppet by means of a retaining ring.

21. A valve assembly having a check valve and a neutral valve, comprising:
- a valve body;
- a check poppet located in the valve body and comprising a first end having a first opening formed therein, a second end having a second opening formed therein, and an internal volume, wherein the check poppet is movable between a first position where the check valve is closed and a second position where the check valve is open;
- a neutral valve member located in the internal volume of the check poppet and movable between a first position where it engages and closes the first opening of the check poppet and a second position where it is disengaged from the first opening of the check poppet;
- a neutral spring engaged to the neutral valve member and the check poppet, wherein the neutral spring biases the neutral valve member to the second, disengaged position; and
- a bleed orifice in the valve body.

22. The valve assembly of claim 21, wherein the bleed orifice is approximately 0.027 inches in diameter and the check poppet first opening is approximately 0.040 inches in diameter.

* * * * *